United States Patent
Hao et al.

(10) Patent No.: US 11,920,063 B2
(45) Date of Patent: Mar. 5, 2024

(54) OIL-RESISTANT OPTICALLY CLEAR ADHESIVES

(71) Applicant: 3M INNOVATIVE PROPERTIES COMPANY, St. Paul, MN (US)

(72) Inventors: Encai Hao, Woodbury, MN (US); Jason D. Clapper, Lino Lakes, MN (US); Albert I. Everaerts, Tucson, AZ (US); Richard B. Ross, Cottage Grove, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 141 days.

(21) Appl. No.: 17/453,299

(22) PCT Filed: May 5, 2020

(86) PCT No.: PCT/IB2020/054260
§ 371 (c)(1),
(2) Date: Nov. 2, 2021

(87) PCT Pub. No.: WO2020/229948
PCT Pub. Date: Nov. 19, 2020

(65) Prior Publication Data
US 2022/0220342 A1    Jul. 14, 2022

Related U.S. Application Data

(60) Provisional application No. 62/846,317, filed on May 10, 2019.

(51) Int. Cl.
| | |
|---|---|
| C08F 2/46 | (2006.01) |
| C08F 2/50 | (2006.01) |
| C08F 220/18 | (2006.01) |
| C08F 220/28 | (2006.01) |
| C08G 61/04 | (2006.01) |
| C09J 4/00 | (2006.01) |
| C09J 133/06 | (2006.01) |
| C09J 133/14 | (2006.01) |

(52) U.S. Cl.
CPC ............ C09J 4/00 (2013.01); C08F 220/1806 (2020.02); C08F 220/281 (2020.02); C09J 133/066 (2013.01); C09J 133/14 (2013.01); C08F 2800/20 (2013.01)

(58) Field of Classification Search
CPC .... C08F 2/48; C08F 220/1806; C08F 220/20; C08F 220/281; C08F 220/56; C08F 220/1812; C09D 133/066; C09D 133/14; C09D 4/00
USPC .......................................... 522/33, 1; 520/1
See application file for complete search history.

(56) References Cited

U.S. PATENT DOCUMENTS

| | | | |
|---|---|---|---|
| 9,102,774 B2 | 8/2015 | Clapper | |
| 2012/0214936 A1 | 8/2012 | Fujita | |
| 2014/0044961 A1 | 2/2014 | Takami | |
| 2016/0369136 A1* | 12/2016 | Suzuki | ................ C09J 133/066 |
| 2017/0240782 A1* | 8/2017 | Suwa | ...................... G06F 3/044 |

FOREIGN PATENT DOCUMENTS

| | | |
|---|---|---|
| EP | 3077432 | 10/2016 |
| KR | 1020170064577 | * 6/2017 |
| WO | WO 2016-118399 | 7/2016 |
| WO | WO 2018-224937 | 12/2018 |

OTHER PUBLICATIONS

Kim et al, KR 1020170064577 Machine Translation, Jun. 12, 2017 (Year: 2017).*
Krevelen, "Properties of Polymers", 3$^{rd}$ Edition, 1990, pp. 200-225.
International Search Report for PCT International Application No. PCT/IB2020/054260, dated Jun. 18, 2020, 5 pages.

* cited by examiner

Primary Examiner — Jessica Whiteley
(74) Attorney, Agent, or Firm — Jeffrey M. Olofson

(57) ABSTRACT

The present invention is an oil-resistant adhesive composition including a hydroxy alkyl (meth)acrylate having an alkyl group containing 2 to 4 carbons, a short alkyl (meth)acrylate having an alkyl group containing 6 or less carbons, and a photo-initiator. After the adhesive composition is soaked in oleic acid at room temperature for 7 days, the adhesive composition has an expansion percent of less than about 10%.

19 Claims, No Drawings

OIL-RESISTANT OPTICALLY CLEAR ADHESIVES

FIELD OF THE INVENTION

The present invention relates generally to the field of optically clear adhesives. In particular, the present invention is an oil-resistant, optically clear adhesive composition.

BACKGROUND

Optically clear adhesives (OCAs) are currently used in a variety of electronic display applications and serve an important role in the performance of the display. The primary function of the OCA is to improve optical quality by eliminating air gaps between the multicomponent layers of the display assembly. The presence of air gaps between the layers can lead to light reflection, and in turn, unintentionally decrease the brightness and contrast of the display. Many of the material requirements of OCAs are very challenging given the ever-evolving nature of display technology in combination with rapidly changing component layers and features. OCAs are not only required to form a good adhesive bond with a multitude of substrates that make up the adjacent layers in the assembly, but also need to have excellent conformability to all of the various relief features of the assembly.

Many electronic devices, such as mobile phones and wearable devices, need to be durable enough to withstand various situations. When various chemicals and substances come into contact with the OCA, they can cause the OCA to swell and ultimately fail, either mechanically or optically. Examples of mechanical failures can include debonding/delamination or the presences of bubbles. An example of an optical failure can include a yellow edge Mura defect. These failures can result from exposure and contact of the OCA to oils. In particular, contact with sebum, which reportedly includes triglycerides, wax esters, squalene, and free fatty acids and is secreted from sebaceous glands found in human skin, can contribute to OCA failure. Thus, OCAs can be contaminated by oils secreted by human skin, causing failure of the OCA over time.

After integrating all the components of a display assembly using OCAs, an edge sealing tape, typically in the form of foam tapes or liquid adhesives, is applied around the display assembly edges. However, foam tapes are not an effective method of sealing against chemical ingress and as a result, the OCAs can potentially be polluted by chemicals such as human skin oils, sunscreens, and home-held oils such as cooking oils. When a liquid adhesive is applied to the display assembly edges, the OCAs are initially in direct contact with the liquid adhesive. However, the composition of commonly used liquid adhesive typically includes about 40% wt-75% wt polyurethane acrylates, acrylate monomers, photo-initiators, and other additives. Upon contact with the liquid adhesive, the OCA may swell, resulting in white or yellow color edges after UV curing of the liquid adhesive.

It would therefore be desirable to have an optically clear adhesive having oil resistance properties to prevent the above potential issues.

SUMMARY

In one embodiment, the present invention is an oil-resistant adhesive composition including a hydroxy alkyl (meth)acrylate having an alkyl group containing 2 to 4 carbons, a short alkyl (meth)acrylate having an alkyl group containing 6 or less carbons, and a photo-initiator. After the adhesive composition is soaked in oleic acid at room temperature for 7 days, the adhesive composition has an expansion percent of less than about 10%

In another embodiment, the present invention is an oil-resistant adhesive composition including a hydroxy alkyl (meth)acrylate having an alkyl group containing 2 to 4 carbons, a short alkyl (meth)acrylate having an alkyl group containing 6 or less carbons, and a photo-initiator. The oil-resistant adhesive composition has a haze of less than about 5% after being soaked in oleic acid at room temperature for 4 hours in a 70° C. oven, removed from the oleic acid, and allowed to stand for about 5 minutes.

DETAILED DESCRIPTION

The present invention is an oil-resistant optically clear adhesive (OCA) composition. The OCA composition is resistant to such oils as human body oils, household oils, sunscreen oils, UV curable liquid adhesives, etc. The oil-resistant OCA is useful in improving the durability of mobile devices (i.e., phones, wearable devices, notebooks, etc.) and protecting against chemical ingress or chemical pollution that can cause electronic devices to have mechanical and/or optical failures. Examples of failures can include bubbles, loss of adhesion, and optical mura due to swelling of adhesives used in electronic devices. The oil-resistant OCA of the present invention is thus suitable for direct bonding applications for electronic assemblies and does not require edge protection to prevent contact with oils. In addition to exhibiting resistance to oils, the OCA of the present invention also has a low glass transition temperature (Tg), effective adhesion, and optical clarity.

The oil-resistant optically clear adhesive composition of the present invention generally includes a primary monomer, a secondary monomer, and optionally, a chain transfer agent. The primary monomer generally functions to provide oil resistance as well as adhesion. The primary monomer is a hydroxy alkyl (meth)acrylate, wherein the alkyl group contains 2 to 4 carbons. These can be primary or secondary hydroxy groups. In one embodiment, the primary monomer is a hydroxyalkyl acrylate, wherein the alkyl group contains 2 to 4 carbons. Examples of suitable primary monomers include, but are not limited to, 4-hydroxybutyl acrylate (4-HBA) and 2-hydroxyethyl acrylate (2-HEA). In one embodiment, the oil-resistant OCA composition includes between about 35 and about 80 wt % primary monomer (or polymer once polymerized), particularly between about between about 40 and about 70 wt % primary monomer, and more particularly between about 45 and about 60 wt % primary monomer.

The secondary monomer functions generally to provide adhesion and can also aid in modifying the glass transition temperature and molecular weight of the oil-resistant OCA. In some applications, the molecular weight can be important as a smaller molecular weight can typically improve flow (high tan delta) of the adhesive, which can be important for applications that need to wet ink steps. Flow can also be related to the glass transition temperature of the adhesive. The secondary monomer is a short alkyl (meth)acrylate wherein the alkyl group contains 6 or less carbons. Examples of suitable secondary monomers include, but are not limited to: n-hexyl acrylate, n-butyl acrylate, cyclohexyl methacrylate (CHMA), cyclohexyl acrylate (CHA), 2-methylbutyl acrylate, and hydroxypropyl methacrylate. In one embodiment, the oil-resistant OCA composition includes between about 20 and about 60 wt % secondary monomer, particularly between about between about 30 and about 60 wt % secondary monomer, and more particularly between about 40 and about 55 wt % secondary monomer.

Other monomers may also be included in the oil-resistant OCA for varying purposes. Examples of suitable monomers include, but are not limited to: 2-ethoxyethoxyethyl acrylate (2-EHA), acrylamide, 2-cyanoethyl acrylate, and tetrahydrofurfuryl acrylate (THFA).

The oil-resistant OCA also includes a photo-initiator to polymerize the primary and secondary monomers. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, NJ, USA) or under the trade designation ESACURE KB-1 from Sartomer (Exton, PA, USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl) oxime. Other suitable photoinitiators include, for example, 1-hydroxycyclohexyl phenyl ketone (commercially available under the trade designation IRGACURE 184), bis(2,4,6-trimethylbenzoyl)phenylphosphineoxide (commercially available under the trade designation IRGACURE 819), 2,4,6-trimethylbenzoylphenylphosphinic acid ethyl ester (commercially available under the trade designation IRGACURE TPO-L), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, NY, USA). In one embodiment, the oil-resistant OCA compositions includes between about 0.01 to about 2 wt % photo-initiator, particularly between about 0.02 and about 1 wt % photo-initiator, and more particularly between about 0.02 and about 0.5 wt % photo-initiator.

The oil-resistant OCA may optionally include a chain transfer agent to control polymer molecular weight and rheology, and to provide high flow property. Examples of useful chain transfer agents include, but are not limited to: carbon tetrabromide, alcohols (e.g., ethanol and isopropanol), mercaptans or thiols (e.g., lauryl mercaptan, butyl mercaptan, tert-dodecyl mercaptan, ethanethiol, isooctylthioglycolate, 2-ethylhexyl thioglycolate, 2-ethylhexyl mercaptopropionate, ethyleneglycol bisthioglycolate), mercaptopropanetrimethoxysilane, 1,4-bis (3-mercaptobutyloxy) butane, and mixtures thereof. An example of a particularly suitable chain transfer agent includes 3-mercaptopropyltrimethoxysilane. In one embodiment, the oil-resistant OCA includes up to about 0.5 wt % chain transfer agent, particularly between about 0.05 and about 0.4 wt % chain transfer agent, and more particularly between about 0.1 and about 0.25 wt % chain transfer agent.

Other materials can be added to the oil-resistant OCA for special purposes, including, for example: molecular weight control agents, coupling agents, plasticizers, heat stabilizers, adhesion promoters, UV stabilizers, UV absorbers, curing agents, polymer additives, photo-initiators, crosslinking agents, surface modifying agents, ultraviolet light stabilizers, antioxidants, antistatic agents, thickeners, fillers, thixotropic agents, processing aids, nanoparticles, and combinations thereof.

To make the oil-resistant OCA of the present invention, the primary monomer, secondary monomer, photo-initiator, optional chain transfer agent, and other optional materials are mixed and partially polymerized by exposure to ultraviolet (UV) rays to form a coatable syrup. In one embodiment, the materials are exposed to the UV rays in a nitrogen atmosphere. In one embodiment, the syrup has a viscosity of about 1000 cp. Additional photo-initiator can be added to the syrup and the syrup mixed on a roller. The resulting syrup is degassed and coated onto a substrate. In one embodiment, the syrup is knife-coated at a thickness of 150 microns between two silicone treated release liners. The resulting coating is then cured by exposure to low intensity UV rays to get full conversion. In one embodiment, the coating is exposed to the UV rays in an oven having a maximum UV output of about 300-400 nm.

In one embodiment, a release liner may be attached to the oil resistant OCA prior to use. Any suitable release liner can be used without departing from the intended scope of the present invention. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from SKC Haas (Rochester, NY) under the trade designation "RF02N" and "RF" that have a silicone release coating on polyethylene terephthalate (PET) film.

During use, the release liner is removed to adhere the oil-resistant OCA to another substrate (i.e., removal of the release liner exposes a surface of an adhesive layer that subsequently can be bonded to another substrate surface). Often, the oil-resistant OCA is permanently bonded to this other substrate, although in some cases the adhesion may be limited to allow for reworking of the display.

The optically clear adhesive of the present invention has high oil resistant performance. High oil resistant performance means that the OCA maintains optical clarity, bond strength, and resistance to delamination (e.g., swelling) over the lifetime of the article in which it is used. As used herein, the term "optically clear" refers to a material that has a haze of less than about 6%, particularly less than about 4%, more particularly less than about 2%%, and most particularly less than about 1%; a luminous transmission of greater than about 88%, particularly greater than about 89%, and more particularly greater than about 90%; and an optical clarity of greater than about 98%, particularly greater than about 99%, and more particularly greater than about 99.5% when cured. Typically, the clarity, haze, and transmission are measured on a construction in which the adhesive is held between two optical films, such as poly(ethylene terephthalate) (PET). The measurement is then taken on the entire construction, including the adhesive and the substrates. Both the haze and the luminous transmission can be determined using, for example, ASTM-D 1003-92. The optical measurements of transmission, haze, and optical clarity can be made using, for example, a BYK Gardner haze-gard plus 4725 instrument (Geretsried, Germany). The BYK instrument uses an illuminant "C" source and measures all the light over that spectral range to calculate a transmission value. Haze is the percentage of transmitted light that deviates from the incident beam by more than 2.5°. Optical clarity is evaluated at angles of less than 2.5°. Typically, the oil-resistant OCA is visually free of bubbles. In one embodiment, the oil resistant OCA maintains these optical properties even after being soaked in oleic acid at room temperature for 4 hours in a 70° C. oven, removed, allowed to stand for about 5 minutes, and then measured.

When an adhesive swells due to contact to oils, it can become "gel" like and lead to cohesive failure, weakening the mechanical strength of the adhesive and causing haze, bubbles, delamination and/or excessive swelling (which in turn would distort the bond line). The oil-resistant OCA of the present invention has minimal to no swelling when contacted with oils. In one embodiment, after being soaked in either oleic acid or an oleic acid and oleic acid/olive oil mixture (40/60) at room temperature for 7 days or after accelerated aging for 4 hours in a 70° C. oven, the oil-resistant OCA of the present invention does not show noticeable swelling. One way to measure swelling is to measure the expansion percent of the adhesive after being soaked in oleic acid or an oleic acid and oleic acid/olive oil mixture (40/60) at room temperature for 7 days or after accelerated aging for 4 hours in a 70° C. oven. The expansion percent is defined by the change in length/original length of OCAs. In one embodiment, the oil-resistant OCA has an expansion percent of less than about 10%, particularly less than about 5%, and most particularly less than about 3%.

For an adhesive to swell, the oils need to have some solubility in all or at least part of the adhesive. The oil-resistant OCA of the present invention has solubility parameters that minimize or prevent swelling. The total solubility parameter of the adhesive provides an idea of the strength of interactions between molecules in a compound and is a good indication of solubility of the composition. The hydrogen bonding solubility parameter specifically gives an idea of the strength of so-called hydrogen bonding interactions. The total solubility parameter is defined as the square root of the molecular interaction energy (called cohesive energy) divided by the volume. In one embodiment, the oil-resistant OCA has a total solubility parameter of between about 9.9 and about 14 $(cal/cm^3)^{1/2}$. In some embodiments, the total solubility parameter is no greater than about 13, about 12.5, about 12, about 11.5, or about 11 $(cal/cm^3)^{1/2}$. In one embodiment, the oil resistant OCA has a hydrogen bonding solubility parameter of between about 4.9 and about 7 $(cal/cm^3)^{1/2}$. In some embodiments, the hydrogen bonding solubility parameter is no greater than about 6.5 or about 6.0 $(cal/cm^3)^{1/2}$.

The oil-resistant OCA also has a rheology conducive to good adhesion. In one embodiment, the oil-resistant OCA of the present invention has a glass transition temperature after curing of between about −25° C. and about 10° C., particularly between about −25° C. and about 0° C., and more particularly between about −20° C. and about −5° C. In one embodiment, the tan delta of the oil resistant OCA at 70° C., which measures the flowability of the OCA at elevated temperatures, is greater than about 0.5. Thus, the oil-resistant OCA is able to flow into and around surfaces having varying topographies. The oil-resistant OCA can therefore, for example, fill in the ink steps on a substrate, such as glass. The modulus and glass transition temperature of the oil-resistant OCA can be determined, for example, using a rheological dynamic analyzer such as Model DHR-3 Rheometer, available from TA Instruments, New Castle, Del., USA.

The oil-resistant OCA of the present invention also has effective adhesion even while being resistant to oil. In one embodiment, after being conditioned for 24 hours at 50% relative humidity (RH) at room temperature, when removed, the oil-resistant OCA has an adhesion of greater than about 3 N/cm, particularly greater than about 5 N/cm, and particularly greater than about 10 N/cm using a crosshead speed of 12 inch per min, at an angle of 180 degrees. The peel adhesion strength can be evaluated, for example, using a IMASS SP-2100 tester (available from IMASS INC. Accord, MA). If the peel adhesion of the oil-resistant OCA is too low, the adhesive will fail and may cause an article including it to come apart (delaminate). An adhesive may be considered as failing for example, if adhesive residue remains on either one or both substrates positioned adjacent either side of the adhesive.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis.

Materials Used in the Examples

| Abbreviation | Description and Source |
|---|---|
| 4-HBA | 4-hydroxybutyl acrylate, purchased from Osaka Organic Chemical Ind. Ltd., OSAKA City, Japan |
| n-HA | n-hexyl acrylate, purchased from Bimax, Glen Rock, PA |
| 2-HEA | 2-hydroxyethyl acrylate, obtained from Osaka Organic Chemical Ind. Ltd., OSAKA City, Japan |
| ACM | Acrylamide, obtained form Kowa American Co., New York, NY |
| CHMA | Cyclohexyl methacrylate, obtained from (TCI) Tokyo Chemical Industry Co. Ltd. Tokyo, Japan |
| CHA | Cyclohexyl acrylate, obtained from TCI, Tokyo, Japan |
| CHMA | Cyclohexyl Methacrylate, obtained from TCI, Tokyo, Japan |
| HPMA | Hydroxypropyl methacrylate, purchased from Rohm Hass, Philadelphia, PA under tradename "Rocyl 410" |
| 2-DDA | 2-dodecylacrylate prepared according to U.S. Pat. No. 9,102,774 |
| EOEOEA | Ethoxyethoxyethylacrylate Viscoat 190, Osaka Organic Chemical Industry LTD. |
| THFA | Tetrahydrofurfural Acrylate, TCI, Tokyo, Japan |
| THFMA | Tetrahydrofurfural Methacrylate, TCI, Tokyo, Japan |
| 3-MPMS | 3-mercaptopropyltrimethoxysilane, purchased from Signa-Aldrich, St Louis, MO |
| Irgacure 651 | 2,2-Dimethoxy-1,2-diphenylethan-1-one, obtained from BASF, Florham Park, NJ |
| D1173 | 2-Hydroxy-2-methyl-1-phenyl-propan-1-one, obtained from BASF, Florham Park, NJ |
| HDDA | 1,6 hexanediol diacrylate, obtained from Sartomer, Exton, PA under trade name "SR238" |
| RF02N | Silicone coated PET liner, SKC Hass (Cheonan, Korea) |
| RF12N | Silicone Coating PET liner, SKC Hass ((Cheonan, Korea) |

Test Methods

Oil Resistant Tests:

Optically clear adhesive (OCA) samples were prepared by slitting 0.5 inch×0.5 inch (1.27 cm×1.27 cm) test strips from each of the adhesive transfer tape samples prepared. Then, a release liner on one side of the sample was removed and the OCA square samples were attached (stuck) to the bottom of a petri dish. The top liner was also removed to expose the surface of the OCAs, and the petri dish containing the attached samples were set aside to dwell at room temperature (RT, about 23° C.) for 15 mins. The OCA samples were immersed in either oleic acid or oleic acid/olive oil (40/60) at room temperature for a week, or 4 hours aged in 70° C. oven. The resistance of the adhesive sample to oleic acid was rated using the following guidelines and reported. The samples were rated as "5" if no swelling, discoloration, or bubbles occurred; rated as "3" if the sample had developed haze around the edge area or in the bulk; and rated as "1" if swelling, discoloration, and bubbles were Observed on the samples.

A. Expansion Test

The expansion test measures the (XY) dimension changes of a sample after the sample is soaked in oils for 7 days aged at room temperature. The expansion is defined by the change in length/original length of the OCA sample. For example, if the original length of the OCA is 1.27 cm, and after chemical soaking for 7 days, the length becomes 1.5 cm, then the expansion is 0.23/1.27*100=18.1%. The OCA preferably has less than about 10%, less than about 5%, less than about 3% expansion percent.

B. Haze Test

The haze test measures if the samples become hazy in bulk after being soaked in oil. We prepared 2-inch×4-inch strips OCA samples, then the easy liner (RF02N) were removed. The top side of the OCA samples was clinched with binder clips, and the bottom half of the sample was then immersed in oleic acid. The sample was then aged at 70° C. for 4 hours. The sample was taken out from the liquid, let stand for 5 minutes, and then the haze of sample was measured using a Haze-Guard Plus haze meter (commercially available from BYK-Gardner, Columbia, MD).

Initial Peel Adhesion Strength Test

The adhesive tape sample test strips were prepared by removing the easy liner, typically, RF02N, and laminating primed 2 mils (50 micrometer) PET films on the adhesive and then slitting long test strips of 12.7 mm width. Two replicates were prepared for each adhesive type/panel. After the tight liner was removed, the exposed adhesive surface was then adhered along the length of a float glass substrate and rolled down 2 times. After being conditioned for 24 hours at 50% relative humidity (% RH) at room temperature. The peel adhesion strength was evaluated using an IMASS SP-2100 tester (available from IMASS INC. Accord, MA) using a crosshead speed of 12 inch per minute at an angle of 180° and reported in units of [N/cm].

Shear Storage Modulus and Glass Transition Temperature (Tg)

The modulus and glass transition temperature (Tg) of adhesive samples were determined using a rheological dynamic analyzer (Model DHR-3 Rheometer, which is available from TA Instruments, New Castle, Del., USA) in a parallel plate mode. OCA samples were prepared by stacking OCA layers to a thickness of approximately 1 millimeter (0.039 inches). Samples were then punched out using an 8 millimeter (0.315 inches) diameter circular die and centered between two parallel plates, each having a diameter of 8 millimeters, after removal of the release liner. The plates with adhesive were positioned in the rheometer and compressed until the edges of the adhesive film were uniform with the edges of the top and bottom plates. The temperature was then ramped in two stages, first from 25° C. to −65° C. at 3° C./minute and, after equilibrating back to 25° C., from 25° C. to 150° C. at 3° C./minute while the parallel plates were oscillated at an angular frequency of 1 radian per second and a constant strain of 10 percent. The shear storage moduli (G') and shear loss moduli (G") were measured and used to calculate tan delta (TD=G"/G') as a function of temperature. The peak of the tan delta curve was taken as the glass transition temperature.

Solubility Parameters

Homopolymer solubility parameters were computed employing group contribution methods as described in D. W. van Krevelen, Properties of Polymers, 3rd ed., 1990, Elsevier. The calculations were carried out employing the program Molecular Modeling Pro Plus from Norgwyn Montgomery Software, Inc. (North Wales, Pa.). Co-polymer solubility parameters were then computed as weighted averages of volume fractions of the homopolymers solubility parameters.

Examples

Monomer premix of Examples 1-3 were prepared according to the weight ratios listed in Table 1 and partially polymerized by exposing them to UV-rays in a nitrogen atmosphere to form coatable syrups having a viscosity of about 1000 cp. To each syrup, an additional 0.25% wt of Irgacure 651 was added and the syrups were mixed on a roller overnight. The resulting syrups were degassed and knife-coated at a thickness of 150 microns between two silicone treated release liners (RF02N and RF12N). Next, the resulting coating was exposed to a low intensity UV-ray in an oven (total energy of 1920 mJ/cm2) having a maximum spectrum output from 300-400 nm. The cured OCA sheets were collected.

TABLE 1

| Example | 4-HBA | n-HA | 2DDA | 2-HEA | ACM | D1173 |
|---------|-------|------|------|-------|-----|-------|
| 1 | 83 | | | 14 | 3 | 0.025 |
| 2 | 63 | 20 | | 14 | 3 | 0.025 |
| 3 | 63 | | 20 | 14 | 3 | 0.025 |

The results of the Oil Resistant tests on Examples 1-3 are noted in Table 2.

TABLE 2

| Example | Oil Resistant Evaluation | Notes | Optical Haze |
|---|---|---|---|
| 1 | 5 | No noticeable swelling, optically clear | |
| 2 | 5 | No noticeable swelling, optically clear | |
| 3 | 1 | Some swelling and haze in Bulk | 21.6% after 70° C. for 4 hours |

Monomer premix of Example 4-5 were prepared according to the weight ratios listed in Table 3 and partially polymerized by exposing them to UV-rays in a nitrogen atmosphere to form coatable syrups having a viscosity of about 1000 cp. To each syrup, 0.25% wt of Irgacure 651 and 0.08% of HDDA were added and the syrups were mixed on a roller overnight. The resulting syrups were degassed and knife-coated at a thickness of 150 microns between two silicone treated release liners (RF02N and RF12N). Next, the resulting coatings were exposed to a low intensity UV-ray oven (total energy of 1920 mJ/cm$^2$) having a maximum spectrum output from 300-400 nm. The cured OCA sheets was collected.

TABLE 3

| Example | n-HA | HPMA | HEA | ACM | D1173 |
|---|---|---|---|---|---|
| 4 | 70 | 7.5 | 20 | 5 | 0.1 |
| 5 | 60 | 10 | 25 | 5 | 0.1 |

The results of the Oil Resistant tests on Examples 4-5 are noted in Table 4.

TABLE 4

| Example | Oil Resistant Evaluation | Note | Expansion |
|---|---|---|---|
| 4 | 1 | significant swelling | ~80% |
| 5 | 1 | significant swelling, but less than 5 | ~65% |

Monomer premixes of Examples 6-10 were prepared according to the weight ratios listed Table 5 and partially polymerized by exposing them to UV-rays in a nitrogen atmosphere to form coatable syrups have a viscosity of about 1000 cp. To each syrup, 0.25% wt of Irgacure 651 was added and the syrups were mixed on a roller overnight. The resulting syrups were degassed and knife-coated at a thickness of 150 microns between two silicone treated release liners. Next, the resulting coating was exposed to a low intensity UV-ray oven (total energy of 1920 mJ/cm2) having a maximum spectrum output from 300-400 nm. The cured OCA sheets was collected.

TABLE 5

| Example | 4-HBA | EOEOEA | THFMA | n-HA | 2-HEA | CHA | CHMA | ACM | 3-MPMS | Irgacure 651 |
|---|---|---|---|---|---|---|---|---|---|---|
| 6 | 53 | | | 30 | 14 | | | 3 | 0.15 | 0.1 |
| 7 | 45 | | | 38 | 14 | | | 3 | 0.15 | 0.1 |
| 8 | 40 | | | 43 | 14 | | | 3 | 0.15 | 0.1 |
| 9 | 35 | | | 48 | 14 | | | 3 | 0.15 | 0.1 |
| 10 | 50 | | | 34 | | | 13 | 3 | 0.15 | 0.1 |
| 11 | | | | 34 | 50 | | 13 | 3 | 0.15 | 0.1 |
| 12 | 40 | | 10 | 38 | 10 | | | 2 | 0.15 | 0.1 |
| CE6 | | 40 | | 38 | 10 | 10 | | 2 | 0.15 | 0.1 |

According to the oil resistant evaluation, all of the formulations of Examples 6-9 were rated a 5. Rheology tests, peel adhesion test, and expansion tests were also performed on Examples 6-9 and CE6. The results are noted in Table 6.

TABLE 6

| Example | Rheology | | | Peel | Oil Resistance | |
|---|---|---|---|---|---|---|
| | Tg (° C.) | G' @ 25 C. [kPa] | TD @ 70 C. | Adhesion [N/cm] | Oil Resistance Evaluation | after 4 hrs at 70 C. expansion |
| 6 | −9.5 | 130 | 0.53 | 12.2 | 5 | <5% |
| 7 | −11.5 | 129 | 0.5 | 13.09 | 5 | <5% |
| 8 | −13 | 115 | 0.48 | 13.09 | 5 | <5% |
| 9 | −14 | 106 | 0.48 | 14.4 | 5 | 5-10% |
| 10 | −6 | 144 | 0.69 | n.a. | 5 | <5% |
| 11 | 10.3 | 467 | 0.37 | n.a. | 5 | <5% |
| 12 | −15 | 97 | 0.75 | n.a. | 5 | <5% |
| CE6 | −30 | 26 | 1.1 | n.a. | 1 | >10% |

Calculated Solubility Parameters for Examples 6-11 were also measured and noted in Table 7.

TABLE 7

| Example | Total Solubility Parameter (cal/cm$^3$)$^{1/2}$ | Hydrogen Bonding Solubility Parameter (cal/cm$^3$)$^{1/2}$ |
|---|---|---|
| 6 | 10.4 | 5.7 |
| 7 | 10.2 | 5.4 |
| 8 | 10.1 | 5.2 |
| 9 | 9.9 | 5.0 |
| 10 | 10.0 | 5.0 |
| #11 | 10.2 | 5.3 |

Oil resistance test results for Examples 10-12 and CE6 are shown in Table 8.

TABLE 8

| | 100% Oleic Acid | | 60/40 Olive Oil/ Oleic Acid | | 50/50 Squalene/ Oleic Acid | |
|---|---|---|---|---|---|---|
| Example | Oil Resistance after 4 hr @ 70 C. Expansion | Oil Resist Rating | Oil Resistance after 4 hr @ 70 C. Expansion | Oil Resist Rating | Oil Resistance after 4 hr @ 70 C. Expansion | Oil Resist Rating |
| 10 | <5% | 5 | <5% | 5 | <5% | 5 |
| 11 | <5% | 5 | <5% | 5 | <5% | 5 |
| 12 | <5% | 5 | <5% | 5 | <5% | 5 |
| CE6 | >10% | 1 | >5% | 3 | >5% | 3 |

Although specific embodiments of this invention have been shown and described herein, it is understood that these embodiments are merely illustrative of the many possible specific arrangements that can be devised in application of the principles of the invention. Numerous and varied other arrangements can be devised in accordance with these principles by those of ordinary skill in the art without departing from the spirit and scope of the invention. Thus, the scope of the present invention should not be limited to the structures described in this application, but only by the structures described by the language of the claims and the equivalents of those structures.

What is claimed is:

1. An oil-resistant adhesive composition consisting of:
   at least 40% by weight of a hydroxy alkyl (meth)acrylate having an alkyl group containing 2 to 4 carbons;
   a short alkyl (meth)acrylate having an alkyl group containing 6 or less carbons;
   optionally a monomer selected from 2-ethoxyethoxyethyl acrylate, acrylamide, 2-cyanoacrylate, or tetrahydrofuryfuryl acrylate; and
   a photo-initiator,
   wherein after the adhesive composition is soaked in oleic acid at room temperature for 7 days, the adhesive composition has an expansion percent of less than about 10%.

2. The oil-resistant adhesive composition of claim 1, wherein the hydroxy alkyl (meth)acrylate having an alkyl group containing 2 to 4 carbons comprises one of: 4-hydroxybutyl acrylate (4-HBA), 2-hydroxyethyl acrylate (2-HEA).

3. The oil-resistant adhesive composition of claim 1, wherein the short alkyl (meth)acrylate having an alkyl group containing 6 or less carbons comprises one of: n-hexyl acrylate, n-butyl acrylate, cyclohexyl methacrylate (CHMA), cyclohexyl acrylate (CHA), and 2-methylbutyl acrylate.

4. The oil-resistant adhesive composition of claim 1, wherein the oil-resistant adhesive composition is optically clear.

5. The oil-resistant adhesive composition of claim 1, wherein the oil-resistant adhesive composition has a haze of less than about 5% after being soaked in oleic acid at room temperature for 4 hours in a 70° C. oven, removed from the oleic acid, and allowed to stand for about 5 minutes.

6. The oil-resistant adhesive composition of claim 1, wherein the oil-resistant adhesive composition has a total solubility parameter of between about 9.9 and about 14 (cal/cm$^3$)$^{1/2}$.

7. The oil-resistant adhesive composition of claim 1, wherein the oil-resistant adhesive composition has a hydrogen bonding solubility parameter of between about 4.9 and about 7 (cal/cm$^3$)$^{1/2}$.

8. The oil-resistant adhesive composition of claim 1, wherein the oil-resistant adhesive composition has a glass transition temperature after curing of between about −25° C. and about 10° C.

9. The oil-resistant adhesive composition of claim 1, wherein the oil-resistant adhesive composition has an adhesion of greater than about 3 N/cm using a crosshead speed of 12 inch per min, at an angle of 180 degrees.

10. The oil-resistant adhesive composition of claim 1, further comprising a chain transfer agent.

11. An optically clear, oil-resistant adhesive composition consisting of
   at least about 40 wt % a hydroxy alkyl (meth)acrylate having an alkyl group containing 2 to 4 carbons;

a short alkyl (meth)acrylate having an alkyl group containing 6 or less carbons; optionally a monomer selected from 2-ethoxyethoxyethyl acrylate, acrylamide, 2-cyanoacrylate, or tetrahydrofurfuryl acrylate; and a photo-initiator, wherein the oil-resistant adhesive composition has a haze of less than about 5% after being soaked in oleic acid at room temperature for 4 hours in a 70° C. oven, removed from the oleic acid, and allowed to stand for about 5 minutes.

12. The optically clear, oil-resistant adhesive composition of claim 11, wherein the hydroxy alkyl (meth)acrylate having an alkyl group containing 2 to 4 carbons comprises one of: 4-hydroxybutyl acrylate (4-HBA), and 2-hydroxyethyl acrylate (2-HEA).

13. The optically clear, oil-resistant adhesive composition of claim 11, wherein the short alkyl (meth)acrylate having an alkyl group containing 6 or less carbons comprises one of: n-hexyl acrylate, n-butyl acrylate, cyclohexyl methacrylate (CHMA), cyclohexyl acrylate (CHA), and 2-methylbutyl acrylate.

14. The optically clear, oil-resistant adhesive composition of claim 11, wherein the oil-resistant adhesive composition has a total solubility parameter of between about 9.9 and about 14 $(cal/cm^3)^{1/2}$.

15. The optically clear, oil-resistant adhesive composition of claim 11, wherein the oil-resistant adhesive composition has a hydrogen bonding solubility parameter of between about 4.9 and about 7 $(cal/cm^3)^{1/2}$.

16. The optically clear, oil-resistant adhesive composition of claim 11, wherein the oil-resistant adhesive composition has a glass transition temperature after curing of between about −25° C. and about 10° C.

17. The optically clear, oil-resistant adhesive composition of claim 11, wherein after the adhesive composition is soaked in oleic acid at room temperature for 7 days, the adhesive composition has an expansion percent of less than about 10%.

18. The optically clear, oil-resistant adhesive composition of claim 11, wherein the oil-resistant adhesive composition has an adhesion of greater than about 3 N/cm using a crosshead speed of 12 inch per min, at an angle of 180 degrees.

19. The optically clear, oil-resistant adhesive composition of claim 11, further comprising a chain transfer agent.

* * * * *